March 2, 1965          G. C. HOLMES          3,171,614
MEANS FOR CONTROLLING FLIGHT OF A HELICOPTER OR AUTOGIRO
Filed July 16, 1962
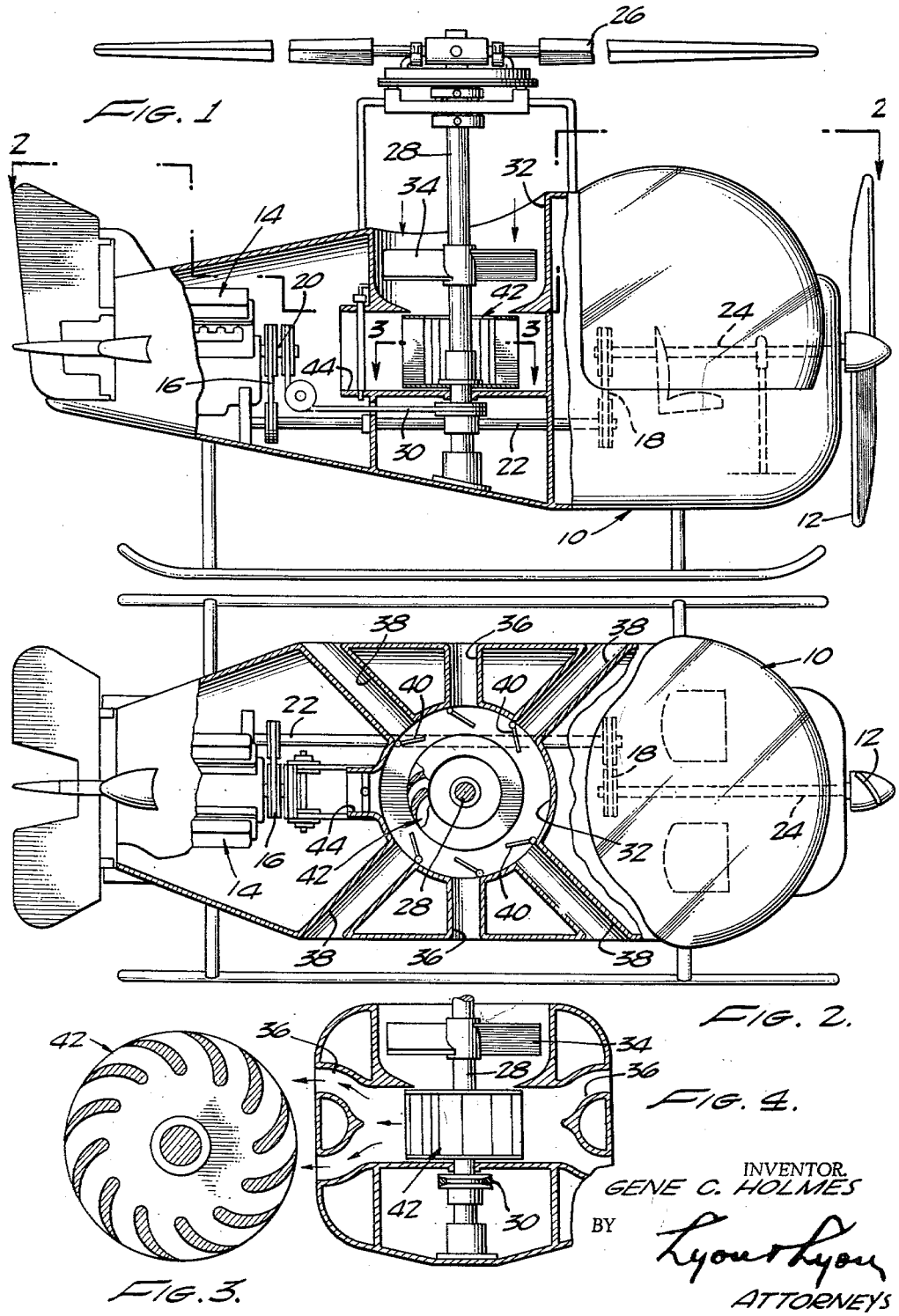
INVENTOR.
GENE C. HOLMES
BY
*Lyon & Lyon*
ATTORNEYS

United States Patent Office 3,171,614
Patented Mar. 2, 1965

3,171,614
MEANS FOR CONTROLLING FLIGHT OF A
HELICOPTER OR AUTOGIRO
Gene C. Holmes, 5708 Briarcliff Road,
Los Angeles 28, Calif.
Filed July 16, 1962, Ser. No. 209,842
9 Claims. (Cl. 244—17.19)

This invention relates to improved means for controlling flight of an aircraft such as a helicopter, autogyro or similar craft utilizing a rotor.

It is an object of this invention to provide means for creating and discharging air pressure in a pre-selected direction creating an applied force at the aero-dynamic center of such an aircraft to provide directional control thereof without tilting same.

It is a further object of this invention to provide such control with or without engine power.

Still a further object of this invention is to provide a positive directional control without tilting of the craft during forced landing without engine power with free wheeling of the rotor shaft creating the air pressure.

Other objects and advantages will be readily apparent from the following description:

In the drawings:

FIGURE 1 is a side elevation partially in section of an aircraft embodying this invention.

FIGURE 2 is a view taken along line 2—2 of FIGURE 1.

FIGURE 3 is a view taken along line 3—3 of FIGURE 1.

FIGURE 4 is a side elevation of a modified form of air discharge passage.

This invention is directed to an improvement disclosed and claimed in my prior United States Patent No. 3,048,353.

The vertically ascending and descending craft 10 is provided with the usual propeller 12 driven by engine 14 through, in this embodiment, belts 16 and 18 and shafts 20, 22 and 24. To render the propeller free wheeling one of the belts 16 may be loosened in any manner well known in the art.

A rotor 26 the pitch of which may be varied by any means well known to those skilled in the art is supported by shaft 28 suitably supported for rotation and driven by a belt 30 from shaft 20. To free wheel the rotor the belt 30 is also loosened by any means well known in the art.

Surrounding the rotor shaft are walls forming an air intake passage 32. An impeller blade 34 may be mounted upon the rotor shaft 28 adjacent the entrance to passage 32 to draw air into same whenever the rotor is turning under power or free wheeling.

Positioned in passage 32 at the aero-dynamic center of the craft are a series of discharge ducts 36. In this embodiment an opposed pair of such ducts are at right angles to the rotor shaft and are normal to the center line of the aircraft to direct air in a horizontal plane thereby to displace the aircraft without tilting. Additional opposed pairs of oblique discharge ducts 38 are provided to discharge air oblique to the center line of the aircraft to displace the aircraft obliquely without tilting.

In each duct a valve 40 is provided to permit selection of the direction of discharge and hence displacement of the aircraft. The valves are positioned to deflect air into the ducts. While single ducts are illustrated, a pair of more vertically aligned ducts may be substituted therefor having the effective application of force for each set at the aero-dynamic center of the aircraft.

As illustrated in FIGURE 4 the air ducts may have two or more openings as an outlet equidistant above and below the aero-dynamic center and applying the effective force at the aero-dynamic center of the aircraft.

Positioned within passage 32 adjacent the discharge ducts and secured to rotor shaft 28 is an air foil fan 42 having a series of blades therein to create and direct air pressure drawn into said air passage 32 out of the desired duct.

A rearward duct 44 would be utilized when all ducts 36 and 38 are closed which directs the air around engine 14 cooling same and discharging same out the open stern of the craft to increase the propulsion.

While in this embodiment air is drawn from the upper side of the aircraft, it is readily apparent that it may be drawn from the underside or elsewhere.

The embodiment described has been particularly directed toward a rotating rotor shaft. However, same is equally adapted to a craft having a fixed rotor shaft with rotors, for example jet driven rotating around same with the impeller blade 34 and air foil fan 42 being driven by the rotors in any manner well known to those skilled ni the art.

While what hereinbefore has been described as the preferred embodiment of this invention, it is readily apparent that alterations and modifications may be resorted to without departing from the scope of this invention, and such alterations and modifications are intended to be included within the scope of the appended claims.

I claim:

1. A device for flight control of a helicopter or autogiro comprising: an air passage, a series of discharge ducts communicating with said air passage at the aero-dynamic center of the aircraft, means for supplying air to said passage and valve means in each discharge duct.

2. A device for flight control of a helicopter or autogiro comprising: an air passage, a series of discharge ducts communicating with said air passage at the aero-dynamic center of the aircraft, means for supplying air to said passage and valve means in each discharge duct, said air supplying means including an impeller adjacent the air inlet to said passage.

3. A device for flight control of a helicopter or autogiro comprising: an air passage, a series of discharge ducts communicating with said air passage at the aero-dynamic center of the aircraft, means for supplying air to said passage and valve means in each discharge duct, and an air distributing member in said air passage adjacent said discharge ducts directing air flow therethrough.

4. A device for flight control of a helicopter or autogiro comprising: an air passage, a series of discharge ducts communicating with said air passage at the aero-dynamic center of the aircraft, means for supplying air to said passage, valve means in each discharge duct, said air supplying means including an impeller adjacent the air inlet to said passage, and an air distributing member in said air passage adjacent said discharge ducts directing air flow therethrough.

5. A device for flight control of a helicopter or autogiro of the type having a rotor shaft comprising: an air passage, a series of discharge ducts communicating with said air passage at the aero-dynamic center of the aircraft, means for supplying air to said passage and valve means in each discharge duct, an air distributing member in said air passage adjacent said discharge ducts directing air flow therethrough, said air supplying means and air distributing member being mounted upon the rotor shaft of said aircraft.

6. A device for flight control of a helicopter or autogiro of the type motivated by a rotor shaft therefor comprising: an air passage, a series of discharge ducts at the aero-dynamic center of the aircraft, communicating with said air passage, means for supplying air to said passage, means for converting rotation of said rotor shaft to drive said air supplying means, and valve means in each discharge duct.

7. A device for flight control of a helicopter or autogiro of the type motivated by a rotor shaft therefor comprising: an air passage, a series of discharge ducts at the aero-dynamic center of the aircraft communicating with said air passage, means for supplying air to said passage and valve means in each discharge duct, said air supplying means including an impeller adjacent the air inlet to said passage, means interconnecting said rotor shaft and said impeller to drive said impeller upon rotation of said rotor shaft.

8. A device for flight control of a helicopter or autogiro of the type motivated by a rotor comprising: an air passage, a series of discharge ducts communicating with said air passage at the aero-dynamic center of the aircraft, means for supplying air to said air passage, means for converting rotation of said rotor to drive said air supplying means, and valve means in each discharge duct.

9. A device for flight control of a helicopter or autogiro of the type motivated by a rotor comprising: an air passage, a series of discharge ducts at the aero-dynamic center of said aircraft communicating with said air passage, means for supplying air to said passage, valve means in each of the discharge ducts, means for converting rotation of said rotor to drive said air supplying means, and said air supplying means including an air foil fan directing air pressure drawn into said air passage out said discharge ducts.

References Cited in the file of this patent
UNITED STATES PATENTS

| | | |
|---|---|---|
| 1,454,283 | Hollander | May 8, 1923 |
| 1,585,281 | Graddock | May 18, 1926 |
| 1,714,561 | Johnston | May 28, 1929 |
| 2,870,978 | Griffith et al. | Jan. 27, 1959 |